Jan. 10, 1928.

W. ELLMAN 1,655,691

CHICKEN FEEDER AND SUPPORTING FRAME

Filed Nov. 9, 1926  3 Sheets-Sheet 1

Inventor
Walter Ellman,
By L. N. Gillis
Attorney

Jan. 10, 1928.                                                                            1,655,691
                                    W. ELLMAN
                        CHICKEN FEEDER AND SUPPORTING FRAME
                             Filed Nov. 9, 1926           3 Sheets-Sheet 2
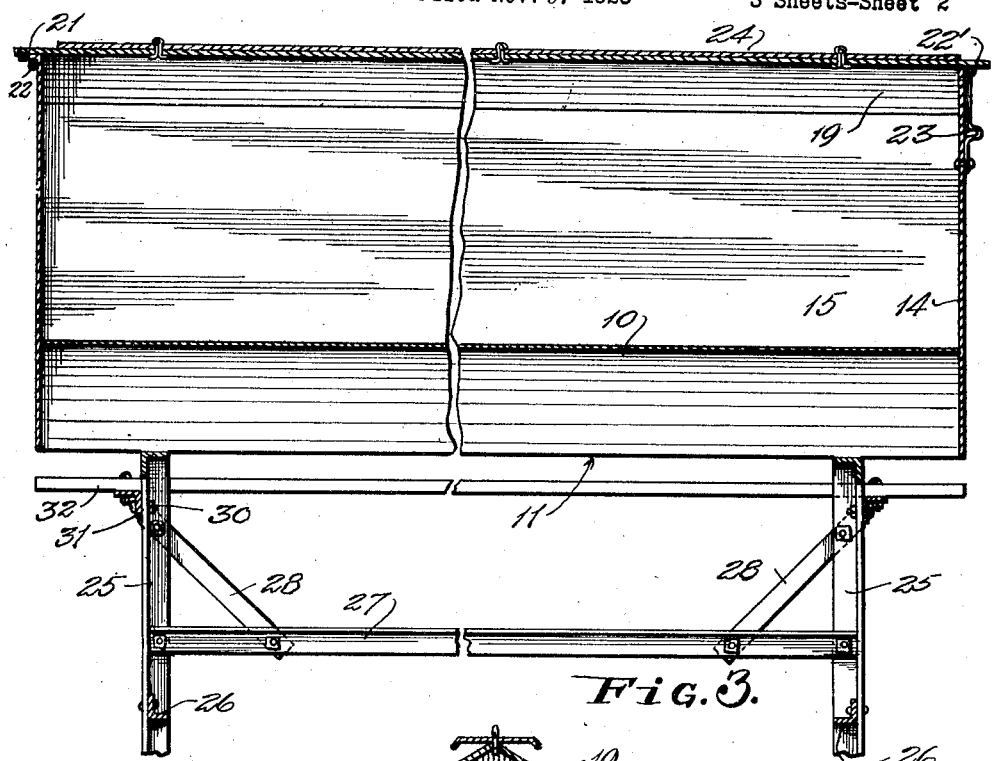
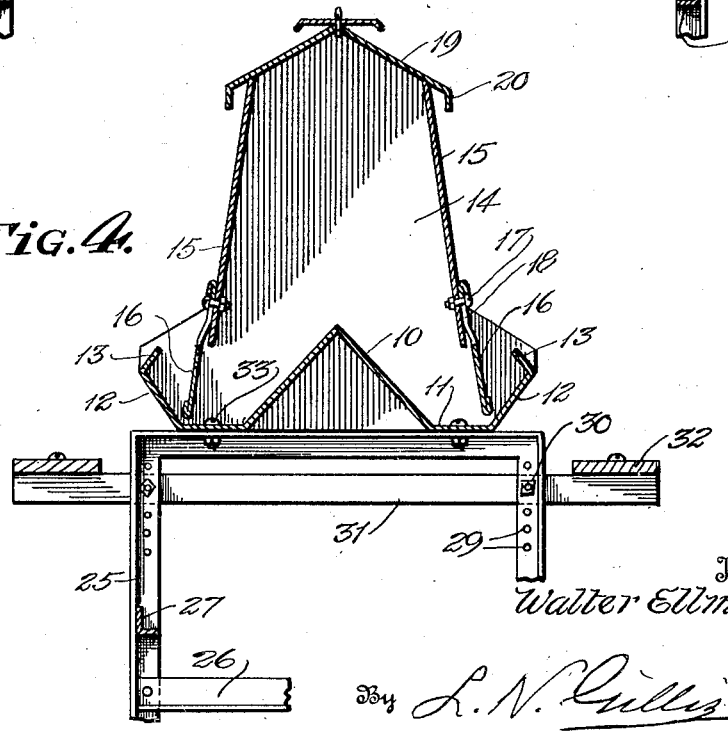
Inventor
Walter Ellman,
By L. N. Gillis
Attorney Jan. 10, 1928.

W. ELLMAN 1,655,691

CHICKEN FEEDER AND SUPPORTING FRAME

Filed Nov. 9. 1926　　3 Sheets-Sheet 3

Inventor
Walter Ellman,
By L. N. Gillis
Attorney

Patented Jan. 10, 1928.

1,655,691

UNITED STATES PATENT OFFICE.

WALTER ELLMAN, OF NORTH BRANCH, NEW YORK.

CHICKEN FEEDER AND SUPPORTING FRAME.

Application filed November 9, 1926. Serial No. 147,295.

This invention relates to poultry feeding devices and has special reference to a chicken feeder and supporting frame arranged to hold the feeder proper off of the ground.

One important object of the invention is to provide an improved chicken feeder wherein the feeder is supported on a knockdown frame and so elevated from the ground that the poultry cannot scratch dirt into the feeder nor can mud splash there into during heavy rain storms as is common with the types of feeders that rest directly on the ground.

A second important object of the invention is to provide a novel feeder of this description wherein the frame is equipped with adjustable perches for the poultry so that the feeder may be used for different sizes of chickens, it being natural that smaller chickens and the smaller breeds, such as bantams, require the perches to be closer to the feeding troughs than the larger breeds, such as cochins and the like.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 3 is an enlarged detail section on the line 3—3 of Figure 2.

Figure 4 is an enlarged detail section on the line 4—4 of Figure 1.

Figure 1:
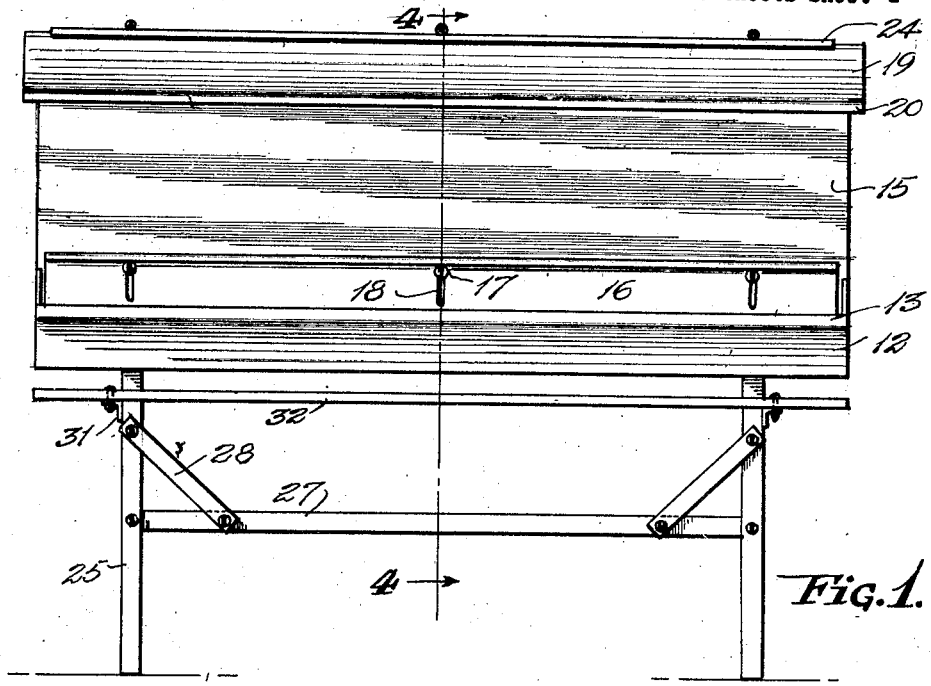
Figure 1 is a side elevation of the improved poultry feeder and its stand.
Figure 2:
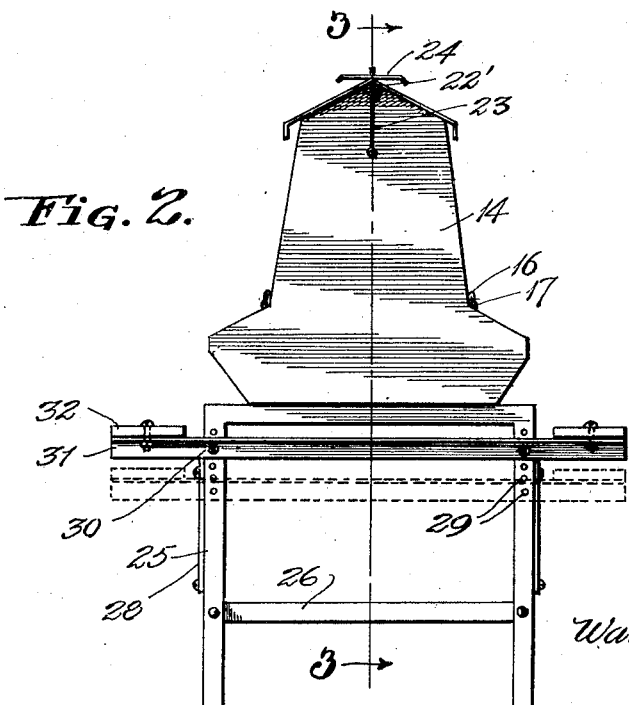
Figure 2 is an end view thereof.
Figure 5:
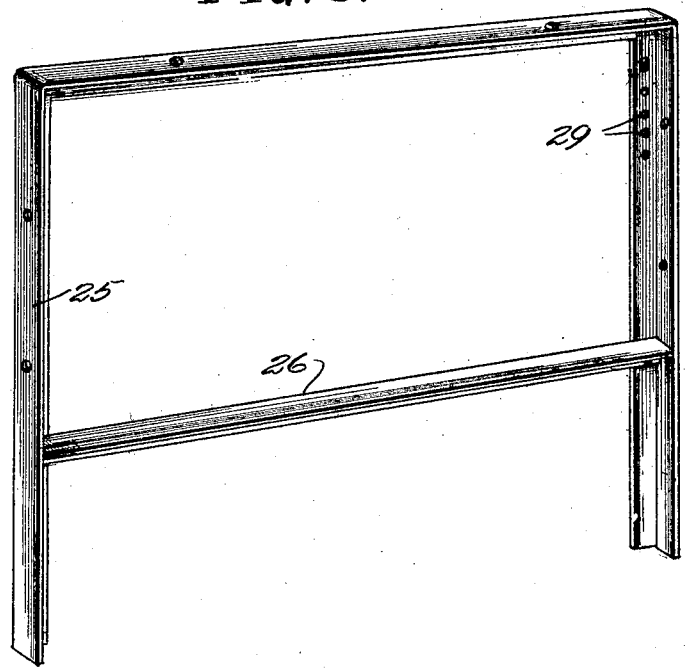
Figure 5 is a detail perspective showing one of the end frames of the device.

In the construction of this feeder there is provided a bottom having an inverted V-shaped central portion 10 extending longitudinally of the feeder and from the edge of this central portion the bottom extends in horizontal portions 11 and is then inclined upwardly and outwardly as at 12 to form the feeding troughs. Each of these troughs is provided with an upwardly and inwardly extending guard flange 13. At each end the feeder is closed by an end plate 14 having inwardly inclined side edges between which extend the side members 15, the lower edges of which terminate in spaced relation to the flat portions 11. Gage plates 16 form downwardly extending continuations of the sides 15 and are secured to said sides by bolts 17 which pass through slots 18 in the gage plates so that the amount of feed flowing from the body of the feeder can be regulated.

Figures 6, 7:
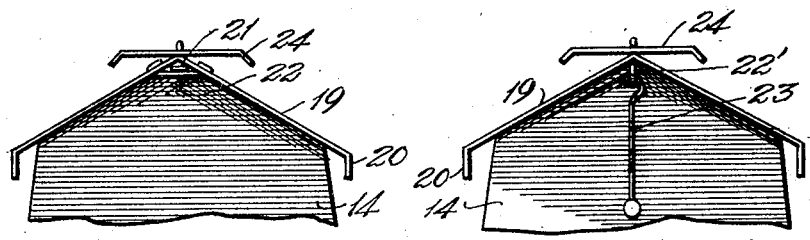
Figure 6 is an enlarged elevation of the upper part of one end of the feeder.
Figure 7 is a view similar to Figure 6 showing the opposite end.
Figures 8, 9:
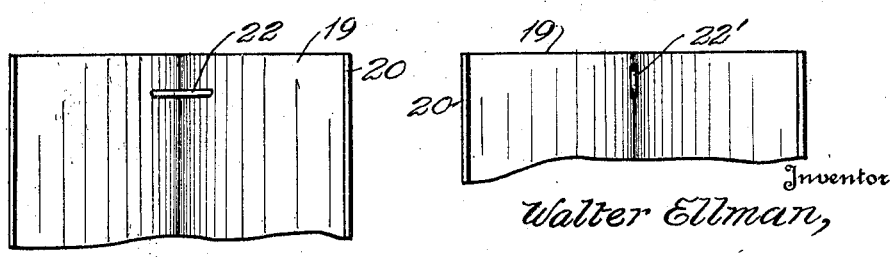
Figure 8 is a bottom view of the feeder cover at the same end as Figure 6.
Figure 9 is a bottom view of the feeder cover at the same end of Figure 7.

The upper edges of the end plates 14 are beveled to support the end portions of a peaked roof or cover 19 extending longitudinally of the feeder and provided on its longitudinal edges with downwardly extending flanges 20. One of the end plates 14 is provided with an outwardly extending tongue 21 which engages over cross wire 22 upon the cover being placed in position. This construction can be well seen in Figures 6 and 8 and holds this end of the cover securely to the feeder. At the other end the cover is provided with an eye 22' which is engageable by a pivoted hook 23 carried on the remaining end plate. This affords means for securing this end of the cover firmer to the body. It will be noted that by freeing the hook from its eye the cover can be slid longitudinally and removed so that the feeder proper can be readily filled. Extending longitudinally of the ridge is a guard plate 24 which is pivoted to tilt upon a fowl attempting to perch thereon.

This feeder proper is supported on a frame of knock-down character and this frame consists of a pair of inverted U-shaped end members 25 having their legs braced by transverse braces 26. The two end frame members are connected below their tops by longitudinal ties 27 bolted to the frame members so that they may be removed with ease. Diagonal braces 28 are likewise bolted to the end frames and to the ties 27 to stiffen the frames at these points. The end frame members and ties 26 and 27 are preferably made of like angle iron and each end frame is provided on each leg with a series of spaced bolt receiving openings 29 so that bolts 30 may be selectively inserted therein to hold the transverse angle members 31 of an adjustable perch unit, these members 31 supporting perch boards 32 bolted thereto. By this means the perch unit may be moved to higher or lower position and the transverse bolted parts of the frame may be taken apart for packing.

With the feeder as thus constructed it is preferred to bolt, as at 33, the feeder proper to the frame and it will be seen that the feeder proper is so supported above the ground that the chickens cannot scratch dirt therein nor can mud splash into the troughs. Furthermore, the quantity of feed may be regulated by the gage plates 16 and the frame adapted by the adjustable perch unit to various sizes of fowls.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

In a poultry feeder, a body having end plates with their top edges arranged in inverted V-shape, a peaked roof plate resting on said top edges, a finger extending outwardly from one end plate, a loop on said roof engageable beneath said finger, a hook pivoted to the remaining end plate, and an eye carried by the roof and engageable by said hook.

In testimony whereof I affix my signature.

WALTER ELLMAN.